(12) United States Patent
Nakamura

(10) Patent No.: US 9,495,574 B2
(45) Date of Patent: Nov. 15, 2016

(54) STACK BARCODE READER AND STACK BARCODE READING METHOD

(71) Applicant: NIDEC SANKYO CORPORATION, Suwa-gun, Nagano (JP)

(72) Inventor: Hiroshi Nakamura, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/084,742

(22) Filed: Mar. 30, 2016

(65) Prior Publication Data

US 2016/0292482 A1    Oct. 6, 2016

(30) Foreign Application Priority Data

Mar. 31, 2015   (JP) ................................. 2015-074073

(51) Int. Cl.
*G06K 7/10* (2006.01)
*G06K 7/14* (2006.01)

(52) U.S. Cl.
CPC .................................. *G06K 7/1443* (2013.01)

(58) Field of Classification Search
USPC ............. 235/462.09, 462.11, 462.16, 462.08
See application file for complete search history.

(56) References Cited

U.S. PATENT DOCUMENTS

| 5,880,453 A | * | 3/1999 | Wang | ..................... G03H 1/041 |
| | | | | 235/462.01 |
| 6,672,511 B1 | * | 1/2004 | Shellhammer | ....... G06K 9/3216 |
| | | | | 235/462.08 |
| 2002/0020747 A1 | * | 2/2002 | Wakamiya | ............... G06K 7/14 |
| | | | | 235/462.11 |

FOREIGN PATENT DOCUMENTS

JP          2014191755 A       10/2014

* cited by examiner

*Primary Examiner* — Allyson Trail
(74) *Attorney, Agent, or Firm* — Cantor Colburn LLP

(57) ABSTRACT

A stack barcode reader may include an imager configured to image the stack barcode; an image memory configured to store an image datum of the stack barcode; and a data processor including a decoder configured to decode an encoded information expressed as the stack barcode, on the basis of the image datum. The decoder may be configured to measure width of a bar and a space of the stack barcode; measure a T-sequence, being a sequence of numerical values, according to line width of a bar and a space of the stack barcode; obtain a code-word corresponding to the T-sequence; and compare a cluster value obtained from the T-sequence with a theoretical cluster value, and modify the T-sequence by using the theoretical cluster value and the conversion table of T-sequence/code-word if there appears a difference between the two cluster values.

5 Claims, 8 Drawing Sheets

FIG. 8

| # | T-SEQUENCE | CLUSTER 'CT' | ROW # | COL # | CLUSTER 'CR' | DIFFERENCE IN CLUSTER VALUES | TSEQ MODIFICATION POSSIBLE/ IMPOSSIBLE | CANDIDATES FOR TSEQ MODIFICATION | RESULT OF TSEQ MODIFICATION | CT AFTER MODIFICATION | FINAL RESULT |
|---|---|---|---|---|---|---|---|---|---|---|---|
| 1 | 233223 | 7 | 3 | 11 | 6 | 1 | YES | (243223) (233224) | NG | — | 999 |
| 2 | 868972 | 7 | 5 | 4 | 3 | 4 | NO | — | — | — | 999 |
| 3 | 562233 | 8 | 13 | 11 | 0 | 1 | YES | 662233 (552233) | OK | 0 | 806 |
| 4 | 445645 | 8 | 15 | 12 | 6 | 2 | NO | — | — | — | 999 |
| 5 | 345566 | 8 | 40 | 5 | 0 | 1 | YES | 445566 (335566) (345576) (345565) | OK | 0 | 536 |

STACK BARCODE READER AND STACK BARCODE READING METHOD

CROSS REFERENCE TO RELATED APPLICATION

The present application claims priority under 35 U.S.C. §119 to Japanese Application No. 2015-074073 filed Mar. 31, 2015, the entire content of which is incorporated herein by reference.

FIELD OF THE INVENTION

At least an embodiment of the present invention relates to a stack barcode reader and a stack barcode reading method in order to optically read a stack barcode.

BACKGROUND

A stack barcode is a kind of barcode materialized by way of stacking one-dimensional barcodes so as to increase the amount of information; and as a typical stack barcode, there is PDF417.

There are proposed various kinds of barcode readers; in which a stack barcode is captured into a digital image by means of an optical method, and the stack barcode in the image is analyzed by means of an image processing method in order to read out a datum recorded (for example, refer to Patent Document 1).

PDF417 (stack barcode) described in Patent Document 1 is provided with an error correction function. The greater number of error-correction code-words PDF417 includes in it, the more error corrections an error correction capability is able to make.

Accordingly, a stack barcode reader described in Patent Document 1 is provided with a decoded result selection unit, for selecting a decoded result having a less number of error corrections. In other words, even in a decoded result, there is a variation in reliability with respect to measured width of a bar and a space; and therefore, in the stack barcode reader, an arrangement is made so as to quantitatively evaluate the variation for a higher level of decoding process.

PATENT DOCUMENT

Patent Document 1; Japanese Unexamined Patent Application Publication No. 2014-191755

Unfortunately, in the stack barcode reader described in Patent Document 1, there is taken no countermeasure with respect to an error that comes up because a code-word corresponding to a pattern of a bar and a space does not exist in a code-word reference table. Accordingly, there is a problem that decoding operation cannot be carried out in the case where the number of such explicit errors exceeds an error correction limit.

SUMMARY

Then, at least an embodiment of the present invention provides a stack barcode reader and a stack barcode reading method that can prevent an error, which can be detected beforehand, from coming up; and that can reduce a processing load in an error-correction step.

In order to bring a solution for the subject described above; a stack barcode reader according to at least an embodiment of the present invention is a stack barcode reader comprising: an imaging unit for imaging a stack barcode in which information is encoded so as to be expressed with a bar and a space; an image memory for storing an image datum of the stack barcode imaged by the imaging unit; and a data processing unit including a decoding unit for decoding an encoded information expressed as the stack barcode, on the basis of the image datum; wherein, the decoding unit includes: a line width measurement means for measuring width of a bar and a space of the stack barcode, on the basis of a plurality of pixel values constituting the image datum; a T-sequence measurement means for measuring a T-sequence, being a sequence of numerical values, according to line width of a bar and a space of the stack barcode measured by the line width measurement means; a code-word obtainment means for obtaining a code-word corresponding to the T-sequence at least measured by the T-sequence measurement means; and a T-sequence modification means that compares a cluster value obtained from the T-sequence by the T-sequence measurement means, with a theoretical cluster value, and modifies the T-sequence by using the theoretical cluster value and the conversion table of T-sequence/code-word if there appears a difference between the above two cluster values.

In the stack barcode reader according to at least an embodiment of the present invention, the decoding unit includes; a cluster comparing function for comparing a cluster value, obtained according to the converted T-sequence of bars and spaces, with a theoretical cluster value; and a modification function for modifying the T-sequence (a bar & space sequence), in the case where exists a difference between both the cluster values, in accordance with a degree of the difference. Therefore, for example, it is possible; to prevent an error, which can be detected beforehand, from coming up; and to reduce a processing load in an error-correction step.

Furthermore, in the stack barcode reader according to at least an embodiment of the present invention, it is preferable that the T-sequence modification means modifies the T-sequence in such a way that the cluster value, obtained from the T-sequence, conforms to the theoretical cluster value. According to this configuration; the T-sequence is modified in such a way that the cluster value, obtained from the T-sequence, conforms to the theoretical cluster value, so that it is still possible to execute referring to a code-word even in the case where an error exists.

A stack barcode reading method according to at least an embodiment of the present invention is a stack barcode reading method for a stack barcode reader comprising: an imaging unit for imaging a stack barcode in which information is encoded so as to be expressed with a bar and a space; an image memory for storing an image datum of the stack barcode imaged by the imaging unit; and a data processing unit including a decoding unit for decoding an encoded information expressed as the stack barcode, on the basis of the image datum; wherein, a process in the decoding unit includes: a first step for measuring width of a bar and a space of the stack barcode, on the basis of a plurality of pixel values constituting the image datum; a second step for measuring a T-sequence, being a sequence of numerical values, according to line width of a bar and a space of the stack barcode measured by way of the first step; a third step for obtaining a code-word corresponding to the T-sequence at least measured by way of the second step; and a fourth step that compares a cluster value obtained from the T-sequence by the second step, with a theoretical cluster value, and modifies the T-sequence by using the theoretical cluster value and the conversion table of T-sequence/code-word if there appears a difference between the above two cluster values.

In the stack barcode reading method according to at least an embodiment of the present invention, the decoding unit includes; a cluster comparing function for comparing a cluster value, obtained according to the converted T-sequence of bars and spaces, with a theoretical cluster value; and a modification function for modifying the T-sequence (a bar & space sequence), in the case where exists a difference between both the cluster values, in accordance with a degree of the difference. Therefore, for example, it is possible; to prevent an error, which can be detected beforehand, from coming up; and to reduce a processing load in an error-correction step.

Furthermore, in the stack barcode reading method according to at least an embodiment of the present invention, it is preferable in the fourth step that the T-sequence is modified in such a way that the cluster value, obtained from the T-sequence, conforms to the theoretical cluster value. According to this configuration; the T-sequence is modified in such a way that the cluster value, obtained from the T-sequence, conforms to the theoretical cluster value, so that it is still possible to execute referring to a code-word even in the case where an error exists.

According to at least an embodiment of the present invention, it becomes possible to prevent an error, which can be detected beforehand, from coming up: and to reduce a processing load in an error-correction step.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8 is a diagram showing an example of a result obtained by way of reading a stack barcode according to the present embodiment.

DETAILED DESCRIPTION

Embodiments of the present invention are described below in association with the accompanying drawings.

Figure 1:
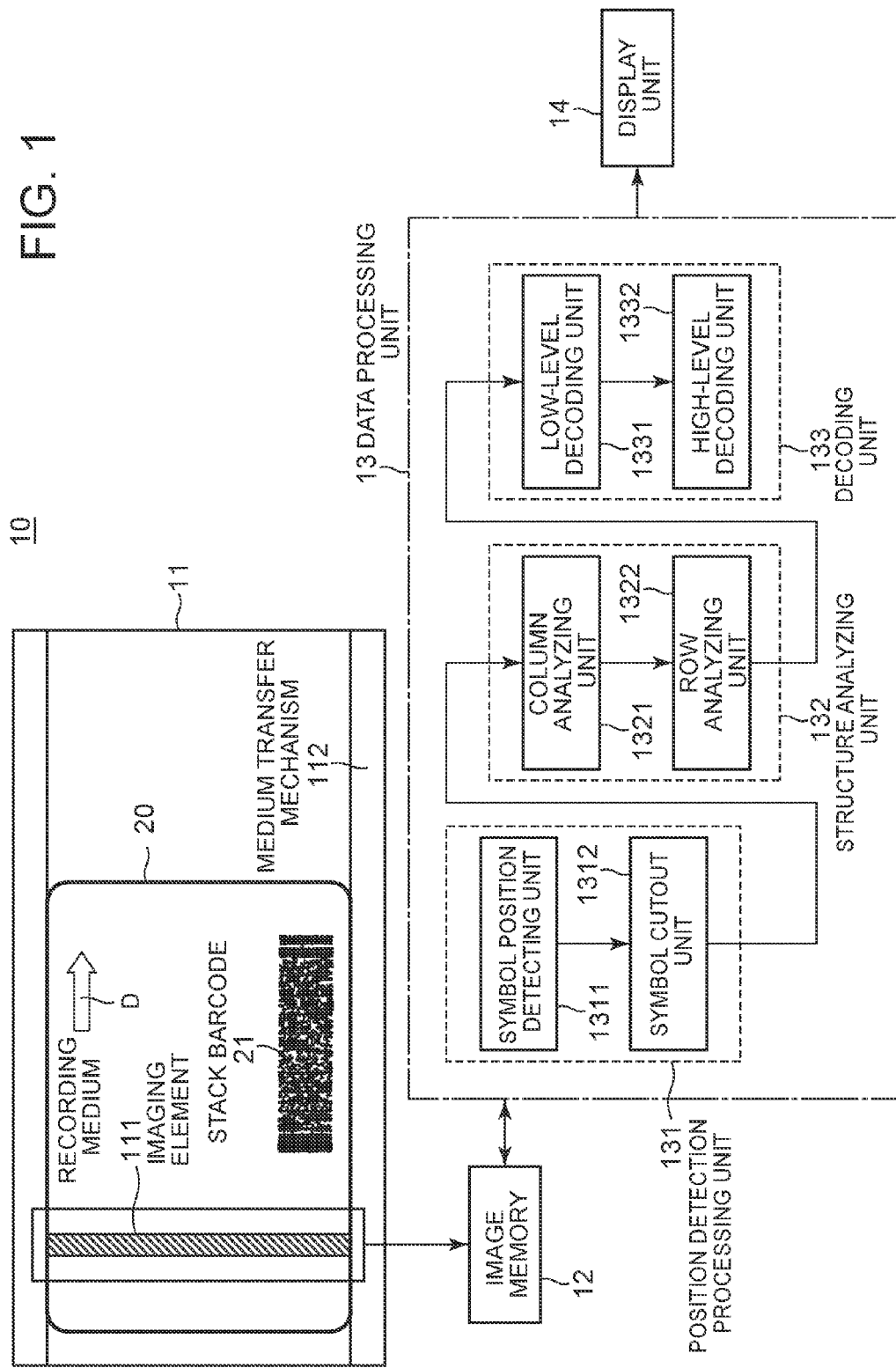
FIG. 1 is a diagram showing a configuration example of a stack barcode reader according to an embodiment of the present invention.

FIG. 1 is a diagram showing a configuration example of a stack barcode reader according to an embodiment of the present invention.

A stack barcode reader 10 according to the embodiment is so configured as to be able to accurately read a whole part of a stack barcode out of an image datum, by way of processing the image datum obtained through imaging a stack barcode (PDF417, in the present embodiment) provided as unique information on a recording medium 20, such as a card, and the like.

As shown in FIG. 1, the stack barcode reader 10 includes: an imaging unit 11, an image memory 12 as a storage unit, a data processing unit 13, and a display unit 14, as main composing elements.

The imaging unit 11 is configured so as to include a contact-type one-dimensional imaging element 111, and a medium transfer mechanism 112 (including a transfer guide) for transferring the recording medium 20, such as a card. On the recording medium 20, to be imaged by the imaging element 111 of the imaging unit 11, there is printed (recorded) a barcode 21 of PDF417, as an example of a stack barcode, in the case shown in FIG. 1.

The stack barcode reader 10 according to the present embodiment is able to read the recording medium 20 on which the stack barcode 21 is printed (recorded), as shown in FIG. 1. Incidentally, a symbol 'D' in FIG. 1 indicates a transfer direction of the recording medium 20. Then, to make an explanation simple, the transfer direction 'D' is consistent with an X-axis direction in the present embodiment. Meanwhile, a direction perpendicular to the transfer direction 'D' is in consistency with a Y-axis direction.

Although a contact-type one-dimensional imaging element is employed as the imaging element 111 in order to downsize the device, it is also possible to employ a two-dimensional area sensor and the like, as the imaging element 111; the two-dimensional area sensor and the like being intended for reading the stack barcode of the recording medium 20 as an object of reading. Incidentally, although a constant-speed transfer device is employed as the medium transfer mechanism; it is also possible to employ a manual type device. Then, the imaging element 111 is configured, for example, with a CCD sensor or a CMOS sensor.

The image memory 12 keeps in memory (stores) an image datum of the recording medium 20, which includes the stack barcode 21 imaged by the imaging element 111. Incidentally, the image memory 12 may be materialized with any device, such as a RAM, an SDRAM, a DDRSDRAM, an RDRAM, and the like, as far as the device can store image data.

The data processing unit 13 includes: a position detection processing unit 131, a structure analyzing unit 132, and a decoding unit 133, as main composing elements.

Each of the elements making up the data processing unit 13 can be materialized with hardware, such as a CPU, a ROM, and a RAM. Incidentally, although in the present embodiment, the data processing unit 13 is configured so as to include three main composing elements; i.e., the position detection processing unit 131, the structure analyzing unit 132, and the decoding unit 133; the data processing unit 13 can also be configured, for example, in such a way as to have the position detection processing unit 131 as a pretreatment unit, and the structure analyzing unit 132 and the decoding unit 133 as a main processing unit.

The position detection processing unit 131 reads an image datum stored in the image memory 12, and detects a position of the stack barcode 21 of the image datum in order to cut out the stack barcode 21.

The position detection processing unit 131 according to the present embodiment includes a symbol position detecting unit 1311 and a symbol cutout unit 1312.

The symbol position detecting unit 1311 reads out (inputs) a digital image of the recording medium 20 from the image memory 12, and detects a position of the stack barcode 21. Then, the symbol position detecting unit 1311 supplies a result of position detection to the symbol cutout unit 1312.

The symbol cutout unit 1312 cuts out an image (picture) of the stack barcode 21, on the basis of information of the symbol position. Then, the symbol cutout unit 1312 supplies image information of the stack barcode 21 that has been cut out.

The structure analyzing unit 132 carries out a structural analysis with respect to a column and a row of the image datum of the stack barcode 21 that has been cut out, in order to identify a boundary position of each column and each row. The structure analyzing unit 132 according to the present embodiment includes a column analyzing unit 1321 and a row analyzing unit 1322. The column analyzing unit 1321 analyzes a column structure of the stack barcode 21, in order to identify a boundary position of each column. The row analyzing unit 1322 analyzes a row structure of the stack barcode 21, in order to identify a boundary position of each row. The structure analyzing unit 132 supplies an analysis result by the column analyzing unit 1321, and an analysis result by the row analyzing unit 1322, to the decoding unit 133.

The decoding unit 133 decodes encoded information of the stack barcode, for example, into character information, on the basis of the structural analysis results. A decoded result by the decoding unit 133 is, for example, displayed at the display unit 14.

According to the present embodiment, a low-level decoding step and a high-level decoding step are carried out in the decoding unit 133. Concretely to describe, in the case of the low-level decoding step for PDF417; code-words constituting a data column that include a line width of each bar and a line width of each space, are converted into intermediate information expressed with 929 codes that are numbered with numerals in a range of 0 to 928. Then, in the high-level decoding step to be carried out next, after the code-words are converted into the intermediate information expressed with 929 codes, the intermediate information is decoded into a final language, on the basis of a predetermined rule. As the final language, for PDF417, there are ASCII characters, binary expressions, other characters, and the like.

The decoding unit 133 according to the present embodiment includes a low-level decoding unit 1331 and a high-level decoding unit 1332. The low-level decoding unit 1331 creates a bar & space pattern for each code-word according to its scanning reflectance rate characteristics (waveform), on the basis of the analysis result of the structure analyzing unit 132. Then, identifying the code-word according to the pattern, the low-level decoding unit 1331 outputs a code-word matrix to the high-level decoding unit 1332. Incidentally, the scanning reflectance rate characteristics (waveform) is explained in Japanese Unexamined Patent Application Publication No. 2014-191755, and therefore an explanation with respect to the scanning reflectance rate characteristics is omitted here.

More concretely to describe, the low-level decoding unit 1331 according to the present embodiment has a conversion function for creating a bar & space pattern, which is a sequence of numerical values called an "X-sequence", formed with an array of line width (element width), out of the scanning reflectance rate characteristics (waveform); and converting the X-sequence into a T-sequence of bars and spaces, formed with an array of line width (element width). The low-level decoding unit 1331 has a cluster comparing function for comparing a cluster value 'CT', calculated according to the converted T-sequence of bars and spaces, with a theoretical cluster value 'CR' determined according to a row number. Furthermore, the low-level decoding unit 1331 also has a line width (element width) modification function for modifying a bar & space sequence, in the case where exists a difference between the cluster values 'CT' and 'CR', in such a way as to cancel the difference in accordance with a degree of the difference.

Figure 2:
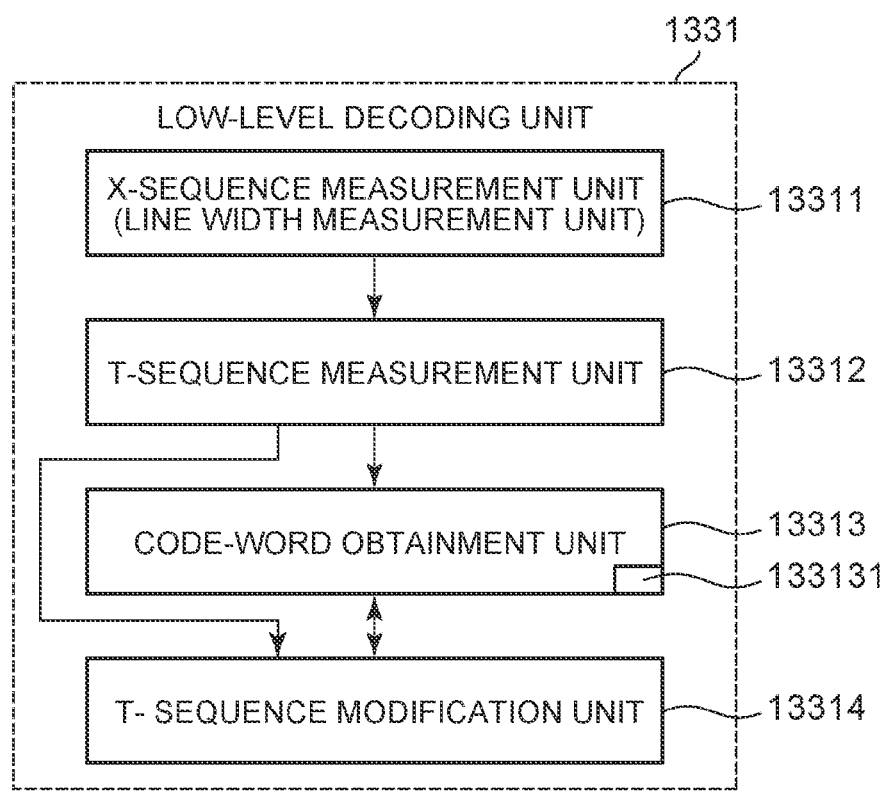
FIG. 2 is a block diagram showing a configuration example of a key part of a low-level decoding unit according to the present embodiment.

FIG. 2 is a block diagram showing a configuration example of a key part of a low-level decoding unit according to the present embodiment.

The low-level decoding unit 1331 shown in FIG. 2 includes an X-sequence measurement unit 13311 as a line width measurement unit, a T-sequence measurement unit 13312, a code-word obtainment unit 13313, and a T-sequence modification unit 13314. In the low-level decoding unit 1331 shown in FIG. 2, the conversion function described above is materialized by the X-sequence measurement unit 13311 and the T-sequence measurement unit 13312; and in the meantime, the cluster comparing function and the line width (element width) modification function are materialized by the T-sequence modification unit 13314.

The X-sequence measurement unit 13311 measures width of a bar and a space of the stack barcode 21, essentially on the basis of a plurality of pixel values constituting an image datum. Concretely to describe, the X-sequence measurement unit 13311 takes out a segment (i.e., a scanning reflectance rate waveform) having column boundaries which the column analyzing unit 1321 has determined, as its both ends, with respect to scanning reflection characteristics of each row of the stack barcode 21; and then, with respect to the segment, the X-sequence measurement unit 13311 calculates a sequence of numerical values called an "X-sequence", formed with an array of line width (element width) of a bar (shown in black) and a space (shown in white).

Moreover, the X-sequence measurement unit 13311 carries out normalization on the measured line width. The normalization in this context means a process for converting a line width (element width) datum expressed with the number of pixels, into an expression with the number of modules. The number of modules in the case of PDF417 is within a range from 1 to 6. One module corresponds to a minimum width of a bar or a space. One column is made up with 17 modules.

The T-sequence measurement unit 13312 measures a T-sequence according to line width of a bar and a space of the stack barcode 21 measured by the X-sequence measurement unit 13311 as a line width measurement unit. Concretely to describe, the T-sequence measurement unit 13312 calculates a sequence of numerical values called a "T-sequence", by way of adding two neighboring elements together in the X-sequence while shifting for one element at a time.

The code-word obtainment unit 13313 obtains a code-word, corresponding to either the T-sequence measured by the T-sequence measurement unit 13312, or a modified T-sequence that the T-sequence modification unit 13314 has modified. The code-word obtainment unit 13313 has a table memory unit 133131; and in the table memory unit 133131, there is stored a code-word conversion (reference) table showing a correspondence relationship between a T-sequence and a code-word. With reference to the code-word conversion (reference) table prepared beforehand in the table memory unit 133131, the code-word obtainment unit 13313 determines a code-word corresponding to each T-sequence. Furthermore, according to the present embodiment, the code-word obtainment unit 13313 obtains a pertinent code-word, by way of referring to a code-word corresponding to a T-sequence that the T-sequence modification unit 13314 has modified.

The T-sequence modification unit 13314 compares a cluster value 'CT' calculated according to the T-sequence by the T-sequence measurement unit 13312, with a theoretical cluster value 'CR'. Then, if there appears a difference between the above two, the T-sequence modification unit 13314 modifies the T-sequence by using the theoretical cluster value 'CR' and the conversion table of T-sequence/code-word. Moreover, the T-sequence modification unit 13314 modifies the T-sequence in such a way that the cluster value 'CT' obtained from the T-sequence conforms to the theoretical cluster value 'CR'. In the meantime, the T-sequence modification unit 13314 obtains at least one effective T-sequence, for referring to a code-word, out of a plurality of T-sequences modified so as to be different sequences of numerical values. Incidentally, the T-sequence modification unit 13314 carries out T-sequence modification when the difference between the cluster value 'CT' obtained from the T-sequence and the theoretical cluster value 'CR' is within a range of +/−1.

Figure 3:
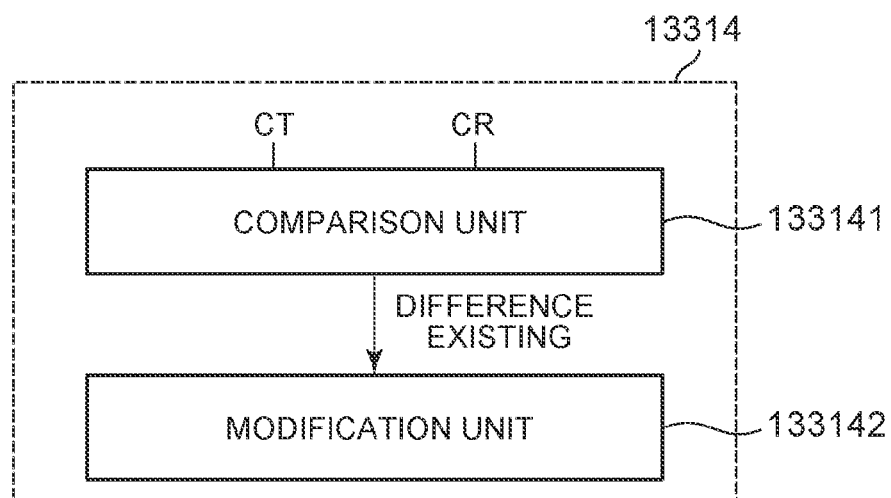
FIG. 3 is a block diagram showing a configuration example of a T-sequence modification unit shown in FIG. 2.

FIG. 3 is a block diagram showing a configuration example of a T-sequence modification unit shown in FIG. 2. The T-sequence modification unit 13314 includes a comparison unit 133141 and a modification unit 133142.

The comparison unit 133141 makes a comparison between the cluster value 'CT' calculated according to the T-sequence by the T-sequence measurement unit 13312 and the theoretical cluster value 'CR'; and then outputs a result of the comparison, to the modification unit 133142.

If there appears a difference between the cluster value 'CT' and the theoretical cluster value 'CR' as a result of the comparison by the comparison unit 133141, the modification unit 133142 modifies the T-sequence by using the theoretical cluster value 'CR' and the conversion table of T-sequence/code-word.

According to the present embodiment; the T-sequence is modified, in the case where the difference (code-word difference) between the cluster value 'CT' and the theoretical cluster value 'CR' is within a range of +/−1.

Described below next is a configuration in which a T-sequence is modified in the case where a difference (code-word difference) exists between the cluster value 'CT' and the theoretical cluster value 'CR'.

A stack barcode, such as PDF417, is provided with an error correction function. The greater number of error-correction code-words the stack barcode includes in it, the more error corrections an error correction capability is able to make. If the number of errors exceeds the error correction capability, no error correction can be made. Therefore, it is needed to reduce the number of errors in advance as much as possible.

Errors include: an "error that can be recognized in advance" and an "error that can be detected in course of an error-correction step." The "error that can be recognized in advance" is an error that comes to the surface, at a time when no pertinent code-word exists, as a result of a cluster value 'CT' calculated according to a T-sequence, with respect to an X-sequence or the T-sequence obtained as a result of a bar & space judgment; and the error is called "erasure" in the PDF417 standards. This error often happens when a bar & space pattern is damaged owing to friction or wrong printing of the stack barcode.

In the meantime, an "error that cannot be recognized in advance" is called "substitution", which happens when the conditions of line width (element width) and the total number of modules are fulfilled, and a pertinent code-word exists at a time of referring to the code-word table. Then, it is unknown whether or not the code-word is erroneous.

In the present embodiment, applied is a configuration in which the number of errors that can be recognized in advance is reduced. For example, it is assumed that, at a time of reading a stack barcode, a result including one or a plurality of erasures is obtained. As described above, the cluster value 'CT' is a cluster value calculated according to the T-sequence, on the basis of the PDF417 standards. On the other hand, the theoretical cluster value 'CR' is a cluster value determined according to a row number of a code-word.

Here, attention is paid to both the cluster values. For example, if it is assumed that a T-sequence element is T[0:5], the cluster value 'CT' is defined as described below:

$$CT=(T[0]-T[1]+T[4]-T[5]+9) \bmod 9$$

The cluster value 'CT' changes its value when the line width (element width), T[0:5], changes owing to a fluctuation of the scanning reflectance rate characteristics. Meanwhile, the theoretical cluster value 'CR' is determined according to a row number of a row where a code-word exists, and therefore the theoretical cluster value 'CR' does not change as far as the row number is correct. In theory, the cluster value 'CT' and the theoretical cluster value 'CR' conform to each other. Meanwhile, unfortunately if the cluster value 'CT' is any value other than 0, 3, or 6, it becomes impossible to refer to a code-word; and at the time, an "erasure" error is settled. In the meantime, if a difference between the cluster value 'CT' and the theoretical cluster value 'CR' is small enough, it becomes still possible to execute referring to a code-word, by way of adjusting the element T[0:5] of the line width (element width) of the T-sequence in such a way that the cluster value 'CT' and the theoretical cluster value 'CR' conform to each other. As described above, according to the present embodiment; the T-sequence is modified (corrected), in the case where the difference (code-word difference) between the cluster value 'CT' and the theoretical cluster value 'CR' is within a range of +/−1.

The high-level decoding unit 1332 carries out an error correction, on the basis of the code-word matrix, and decodes a datum according to the code-word matrix after the correction. A result decoded by the high-level decoding unit 1332 is displayed, for example, in the display unit 14.

Next, a structure of PDF417, as an example of the stack barcode 21, is explained; and subsequently, as a process for concretely reading the stack barcode 21, there are explained a position detection step, a tilt correction step, a structural analysis step, and a decoding step.

(Structure of the Stack Barcode PDF417)

Figure 4:
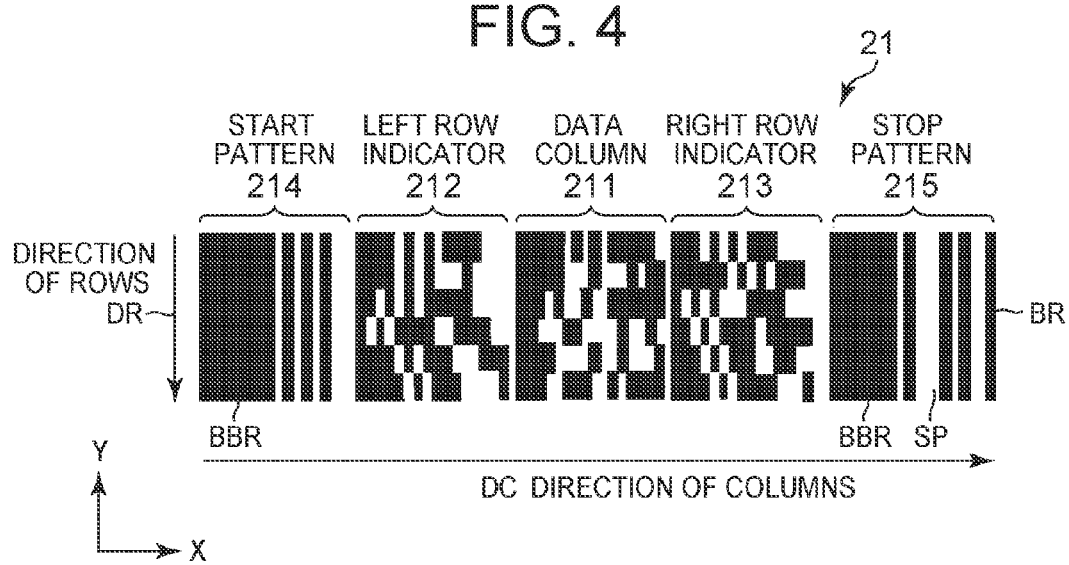
FIG. 4 is a diagram showing an example of an image datum of a label structure of PDF417 that is a stack barcode.

FIG. 4 is a diagram showing an example of an image datum of a label structure of PDF417 that is the stack barcode 21. Incidentally, this stack barcode PDF417 is internationally standardized as ISO/IEC15438.

In FIG. 4, with a Y-direction (a vertical direction) in the figure representing a direction of rows DR (a plurality of rows are placed) and an X-direction (a horizontal direction) representing a direction of columns DC (a plurality of columns are placed), the stack barcode 21 is divided into five major sections in the direction of columns DC. More specifically, as FIG. 4 shows, the stack barcode 21 is divided into five columns; with a data column 211 being placed at a middle part; and a left row indicator 212 and a right row indicator 213 being placed at a left side and a right side next to the data column 211, respectively; and moreover, a start pattern 214 and a stop pattern 215 being placed at a left side and a right side next to the above three sections, respectively.

In the meantime, a barcode part constituting each column is composed of black bar parts BR and white space parts SP; and a wide bar called 'big bar' is formed each in the start pattern 214 and the stop pattern 215. A big bar BBR is a bar, i.e., a widest black part, at a left side position in the start pattern 214 as well as the stop pattern 215, in FIG. 4.

Moreover, as shown in FIG. 4, each of the data column 211, the left row indicator 212 and the right row indicator 213 is composed of six rows (from Row 1 to Row 6) in the direction of rows DR. Three columns (the data column 211, the left row indicator 212 and the right row indicator 213) included in each row contains each one code-word. For example, in the data column 211 of the stack barcode 21, six code-words, namely one code-word (for one data column)× six rows, are included.

Incidentally, a code-word is an elemental unit for symbolizing a value expressing a certain numerical value, a certain character, or any other symbol, or otherwise a value in relation to any of them.

Meanwhile, except a case of the stop pattern 215, there exist four bar parts BR and four space parts SP in each column. Then, each line width is an integral multiple of the minimum width called 'module (unit).' In the meantime, a line width of one code-word is 17 modules; and each of the bar parts BR and space parts is six modules at the maximum in its width. Incidentally, in the case of the stop pattern 215; there exist five bar parts and four space parts, and then a line width of one code-word is 18 modules.

Although the stack barcode 21 shown in FIG. 4 includes only one data column, it is not limited to this structure and the stack barcode may include a plurality of data columns.
(Stack Barcode Reading Method)

Explained next is a method of reading the stack barcode PDF417 according to the present embodiment.

Figure 5:
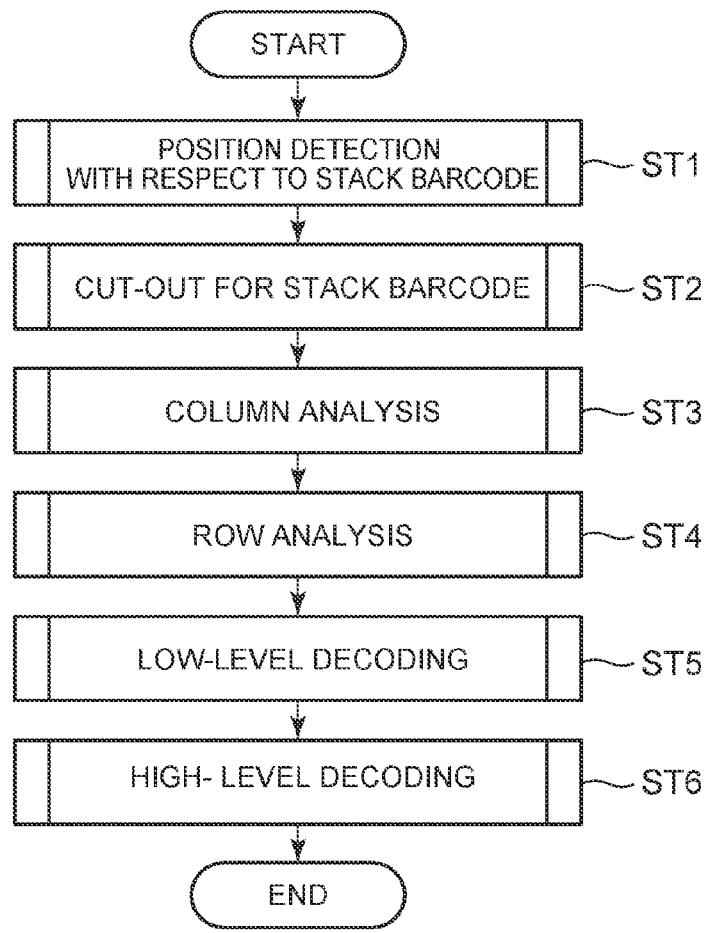
FIG. 5 is a flowchart showing a workflow of a stack barcode reading method according to the present embodiment.

FIG. 5 is a flowchart showing a workflow of a stack barcode reading method according to the present embodiment. The workflow of the stack barcode reading method according to the present embodiment is generally explained below in association with FIG. 5. Then, after the general explanation, each of steps (including Step ST1 through Step ST6) is individually described in detail.

At first, a position detection with respect to the stack barcode 21 is carried out (Step ST1). Concretely to describe, as shown in FIG. 1, the imaging element 111 of the stack barcode reader 10 converts the reflected light of the light, radiated onto the stack barcode 21, into an electrical signal by way of photoelectric conversion in order to obtain an image datum; the stack barcode 21 being placed on the recording medium 20 that has moved along the transfer mechanism 112 to a predetermined position. Then, the obtained image datum of the stack barcode 21 is stored in the image memory 12. The image memory 12 is structured with a finite number of pixels that are arranged in a two-dimensional manner. In the present embodiment, the image datum of the stack barcode 21, which has been imaged, represents a brightness value of each pixel (as a pixel value) expressed with a numerical value. The brightness value is expressed, for example, as an integer in a range from 0 to 255.

Then, the position detection processing unit 131 of the data processing unit 13 reads in the image datum stored in the image memory 12, and then detects a position of the stack barcode 21 in the image datum.

The stack barcode 21, for which the position detection has been carried out in this way, is cut out, for example, in the data processing unit 13 (Step ST2); and then the image datum cut out is stored, for example, in the image memory 12. Incidentally, the stack barcode 21 is cut out as a rectangular shape that is slightly larger than an entire part of the stack barcode 21 itself.

Next, a structural analysis (including a column analysis and a row analysis) is carried out in the data processing unit 13 (Step ST3 and Step ST4). More specifically to describe, the structure analyzing unit 132 of the data processing unit 13 analyzes a structure of the stack barcode 21, on the basis of the image datum cut out at Step ST2. The data processing unit 13 carries out a column analysis (Step ST3) and a row analysis (Step ST4).

At the end, a decoding step (including Step ST5 and Step ST6) is carried out in the decoding unit 133 of the data processing unit 13. More specifically to describe, the decoding unit 133 of the data processing unit 13 carries out a decoding step with respect to the stack barcode 21, on the basis of the structure of the stack barcode 21 analyzed at Step ST3 and Step ST4.

At this time, in the case of PDF417 which is a kind of stack barcode 21, two decoding steps including a low-level decoding step and a high-level decoding step are carried out. The low-level decoding unit 1331 of the decoding unit 133 performs the low-level decoding step (Step ST5), and meanwhile the high-level decoding unit 1332 performs the high-level decoding step (Step ST6).

In the low-level decoding step, code-words constituting a data column that include a line width of each bar and a line width of each space, are converted into intermediate information expressed with 929 codes that are numbered with numerals in a range of 0 to 928. Then, in the high-level decoding step to be carried out next, after the code-words are once converted into the intermediate information expressed with 929 codes, the intermediate information is decoded into a final language, on the basis of a predetermined rule.

Next, each required step of the flowchart shown in FIG. 5 is explained below in detail.
(Structural Analysis)

Figure 6:
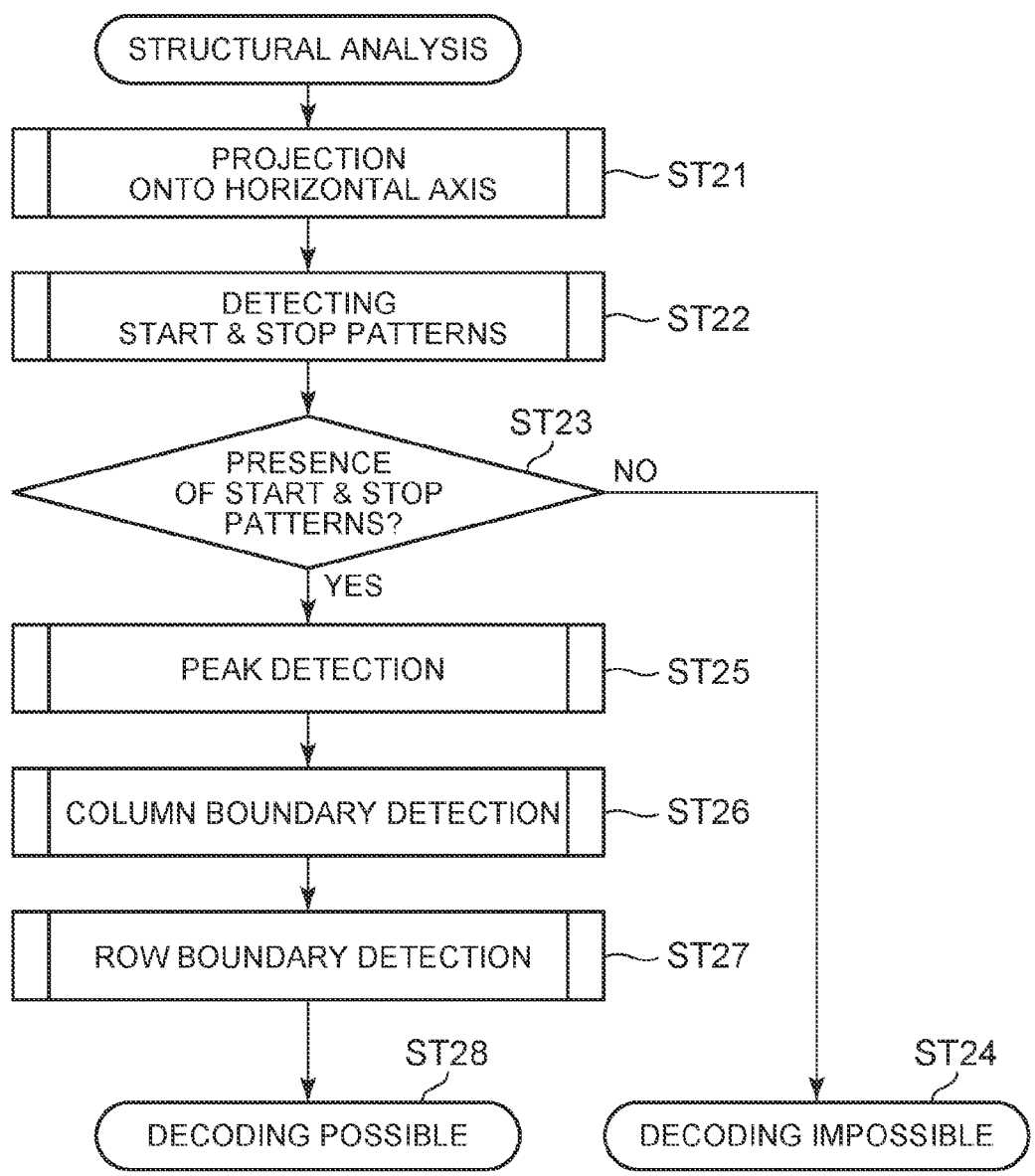
FIG. 6 is a flowchart showing a workflow of a structural analysis (Step ST3 and Step ST4) in the flowchart shown in FIG. 5.

The structural analysis of Step ST3 and Step ST4 shown in FIG. 5 is explained below. FIG. 6 is a flowchart showing a workflow of the structural analysis (Step ST3 and Step ST4) in the flowchart shown in FIG. 5.

In FIG. 6, a projection onto a horizontal axis is carried out (Step ST21) at first in the structure analyzing unit 132. Concretely to describe, it is a process in which a sum of brightness values of all pixels arranged in the Y-axis direction (vertical direction) is calculated, with respect to each of pixel columns arranged in the X-axis direction (horizontal direction), according to the image datum of the stack barcode 21, and then the sum is stored in the image memory 12.

Subsequently, with respect to the obtained sum of brightness values, a difference between pixels positioned side-by-side in the X-axis direction (horizontal direction) is calculated, and then an analysis on the start pattern 214 and the stop pattern 215 is made by using the calculated difference value (Step ST22).

As shown in FIG. 4 and so on; with respect to the start pattern 214 and the stop pattern 215, being different from code-words of other sections such as the data column 211, the left row indicator 212, and the right row indicator 213, there exists a common and constant pattern in every row (six rows in the present embodiment). Therefore, each of the start pattern 214 and the stop pattern 215 is averaged by carrying out a projection onto the X-axis (a projection onto the horizontal axis) so that, being unlikely affected by uneven brightness, a stain, and the like, a stable detection can be carried out.

Then, after making a judgment on whether or not the start pattern 214 and the stop pattern 215 have appropriately been detected (Step ST23), operation moves to Step ST25, in the case where it is judged that the start pattern 214 and the stop pattern 215 have appropriately been detected. On the other hand, if it is judged that the start pattern 214 and the stop pattern 215 have not appropriately been detected, it is determined that decoding cannot be done, and namely decoding operation cannot be carried out, and then the operation finishes (Step ST24).

Subsequently, a peak detection is carried out (Step ST25). If it is judged to be a peak, a pixel position having the peak value is stored in the image memory 12.

Next, a column boundary detection is carried out (Step ST26). More specifically, according to pixel positions having each peak value, which have been stored at Step ST25, each boundary of five columns; i.e., the start pattern 214, the left row indicator 212, the data column 211, the right low indicator 213, and the stop pattern 215; is detected.

Next, a row boundary detection is carried out (Step ST27). Then, according to the row boundary detection, it is judged which row each line 'L' of the image data is included in, for enabling a decoding process (decoding), and then operation finishes (Step ST28).

(Low-Level Decoding)

Figure 7:
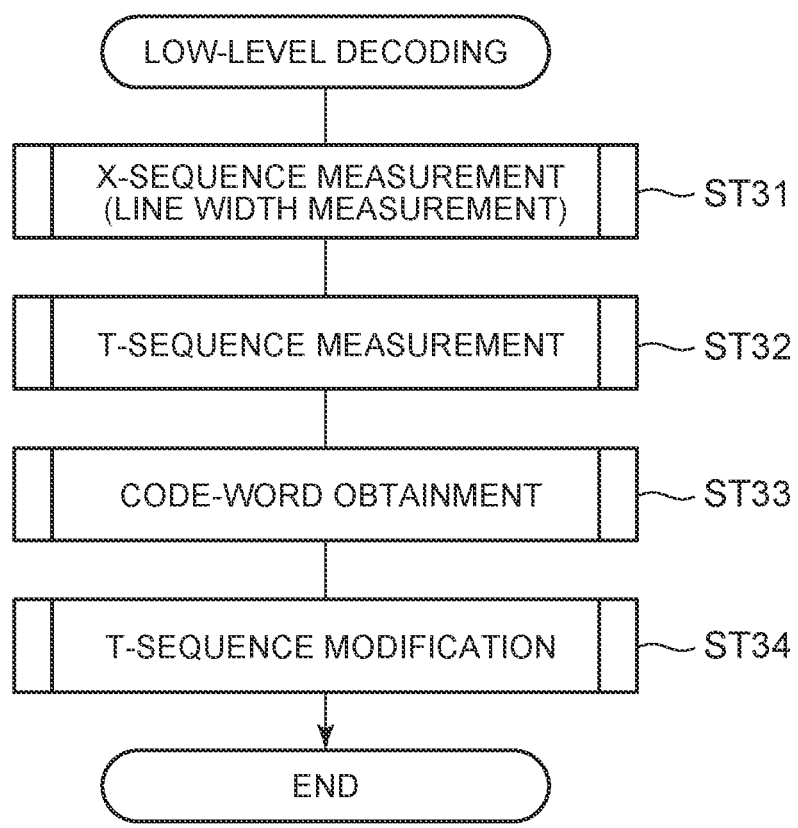
FIG. 7 is a flowchart showing a workflow of low-level decoding (Step ST5) in the flowchart shown in FIG. 5.

Next, the low-level decoding step, shown as Step ST5 in FIG. 5, is explained. FIG. 7 is a flowchart showing a workflow of the low-level decoding step (Step ST5) in the flowchart shown in FIG. 5.

As shown in FIG. 7, the low-level decoding step includes: an X-sequence measurement step (Step ST31), a T-sequence measurement step (Step ST32), a code-word obtainment step (Step ST33), and a T-sequence modification step (Step ST34); wherein, with respect to scanning reflection characteristics of each row of the stack barcode 21, a segment (i.e., a scanning reflectance rate waveform) having column boundaries determined by the column analysis as its both ends is taken out; a sequence of numerical values called X-sequence formed with an array of line width of bars and spaces constituting one column is calculated, in the X-sequence measurement step (Step ST31); a sequence of numerical values called T-sequence is calculated by way of summing two neighboring bars and one space of the X-sequence, while these elements being shifted one by one, in the T-sequence measurement step (Step ST32); and a code-word corresponding to each T-sequence is determined with reference to a code-word conversion table (code-word reference table) prepared in advance, in the code-word obtainment step (Step ST33); and then, in the T-sequence modification step (Step ST34), a comparison is made between the cluster value 'CT' calculated according to the T-sequence measured by the T-sequence measurement unit 13312, and the theoretical cluster value 'CR', and the T-sequence is modified by using the theoretical cluster value 'CR' and the conversion table of T-sequence/code-word if there appears a difference between the above two.

In PDF417 being a kind of the stack barcode 21, two decoding steps, that is to say, a low-level decoding step and a high-level decoding step, are carried out. Concretely to describe, in the case of PDF417; in the low-level decoding step, code-words constituting a data column, which include a line width of each bar and a line width of each space, are converted into intermediate information expressed with 929 codes that are numbered with numerals in a range of 0 to 928. Then, in the high-level decoding step to be carried out next, after the code-words are converted into the intermediate information expressed with 929 codes, the intermediate information is decoded into a final language, on the basis of a predetermined rule. As the final language, for PDF417, there are ASCII characters, binary expressions, other characters, and the like.

(X-Sequence Measurement in Low-Level Decoding)

In an X-sequence measurement step, for each row, a line waveform as a result of averaging a plurality of lines 'L's included in the row is scanned, in order to carry out a line width measurement for obtaining a line width of each bar and a line width of each space; and then subsequently, the line width expressed with the number of pixels is converted into expression with the number of modules so as to obtain X-sequence. Incidentally, scanning lines are, for example, a plurality of lines 'L's formed almost in a center part of each row in the direction of rows; and in other words, bring in a matrix of pixels including a plurality of rows. Moreover, an average of brightness values of pixels constituting the plurality of lines 'L's is calculated; and the averaged brightness value of pixels is used for the decoding process, as a scanning reflectance rate waveform, representing the brightness value of pixel in the row.

As described above, in the X-sequence measurement step, the line width measurement is carried out. More specifically to describe, the line width measurement is a step in which a pixel pattern of each row is scanned for obtaining a dimension of a bar and a space; i.e., a line width.

(T-Sequence Measurement in Low-Level Decoding)

Next to the X-sequence measurement step, the T-sequence measurement step (Step ST32 shown in FIG. 7) is carried out.

Concretely to describe, in the T-sequence measurement step; an X-sequence X[0:7] is converted into T[0:5]. Each value is calculated by way of adding Xi and Xi+1 that are neighboring side-by-side. For example, an X-sequence X[0:7]=[2, 1, 1, 1, 1, 3, 2, 6] is converted into a sequence of line width of T-sequence T[0:5]=[3, 2, 2, 2, 4, 5].

(Code-Word Obtainment in Low-Level Decoding)

Then, the code-word obtainment step (Step ST33 shown in FIG. 7) is carried out. Specifically to describe, by way of referring to a code-word conversion table prepared in advance in the table memory unit 133131, a code-word corresponding to each T-sequence is obtained (determined). In other words, the low-level decoding step is carried out in such a way that code-words constituting a column, which include line width of four bars and line width of four spaces, are converted into intermediate information expressed with 929 codes that are numbered with numerals in a range of 0 to 928.

(T-Sequence Modification Step in Low-Level Decoding)

In the present embodiment, operation does not immediately move to the high-level decoding step, just after the code-word obtainment step (Step ST33); and instead, the T-sequence modification step (Step ST34) is carried out next. More specifically to describe, a comparison is made between the cluster value 'CT' calculated according to the T-sequence and the theoretical cluster value 'CR'; and then, the T-sequence is modified by using the theoretical cluster value 'CR' and the conversion table of T-sequence/code-word if there appears a difference between the above two.

In other words, according to the present embodiment; the T-sequence is modified, in the case where a difference (code-word difference) exists between the cluster value 'CT' and the theoretical cluster value 'CR'.

As already described earlier, a stack barcode such as PDF417 is provided with an error correction function. The greater number of error-correction code-words the stack barcode includes in it, the more error corrections an error correction capability is able to make. If the number of errors exceeds the error correction capability, no error correction can be made. Therefore, it is needed to reduce the number of errors in advance as much as possible.

Errors include: an "error that can be recognized in advance" and an "error that can be detected in course of an error-correction step." The "error that can be recognized in advance" is an error that comes to the surface, at a time when no pertinent code-word exists, as a code-word table is searched in relation to a cluster value 'CT' calculated according to a T-sequence, with respect to an X-sequence or the T-sequence obtained as a result of a bar & space judgment; and the error is called "erasure" in the PDF417 standards. This error often happens when a bar & space pattern is damaged owing to friction or wrong printing of the stack barcode.

In the meantime, an "error that cannot be recognized in advance" is called "substitution", which happens when the conditions of line width (element width) and the total number of modules are fulfilled, and a pertinent code-word exists at a time of referring to the code-word table. Then, it is unknown whether or not the code-word is erroneous.

In the present embodiment, applied is a configuration in which the number of errors that can be recognized in advance is reduced. FIG. 8 is a diagram showing an example of a result obtained by way of reading PDF417, as a stack barcode, according to the present embodiment.

In the reading result shown in FIG. 8, there are included five erroneous results (erasures) #1 through #5; wherein the row ('ROW') and the column (COL') represent a position of each code-word in the matrix, and the cluster value 'CT' is a cluster value calculated according to the T-sequence, on the basis of the PDF417 standards. On the other hand, the theoretical cluster value 'CR' is a cluster value determined according to a row number of a code-word.

Incidentally, as described earlier; in the low-level decoding step, code-words constituting a data column that include a line width of each bar and a line width of each space, are converted into intermediate information expressed with 929 codes that are numbered with numerals in a range of 0 to 928. In the final result shown in FIG. 8; if the conversion is normally carried out without any error, a numeral in the range of 0 to 928 is shown. On the other hand, if the conversion is not normally carried out, a numeral outside the range of 0 to 928 is shown, for example, such as "999". Meanwhile, a numeral "999" in the final result represents a number showing a result in the case where; T-sequence modification is erroneous though the T-sequence modification could be done, or T-sequence modification could not be done. Hereinafter, the numeral "999" is called an erroneous modification numeral. Incidentally, in an explanation with respect to FIG. 8 described below; a result of T-sequence (TSEQ) modification in the case of erroneous modification with the T-sequence modification itself enabled is represented as 'NG'; a result of T-sequence modification in the case of the T-sequence modification being correct is represented as 'OK'; and no T-sequence modification to be carried out, because of a difference between the cluster value 'CT' and the theoretical cluster value 'CR' being outside the range of +/−1, is represented as '−'.

Here, attention is paid to both the cluster values. For example, if it is assumed that a T-sequence element is T[0:5], the cluster value 'CT' is defined as described below:

$$CT=(T[0]-T[1]+T[4]-T[5]+9) \bmod 9$$

The cluster value 'CT' changes its value when the line width (element width), T[0:5], changes owing to a fluctuation of the scanning reflectance rate characteristics. Meanwhile, the theoretical cluster value 'CR' is determined according to a row number of a row where a code-word exists, and therefore the theoretical cluster value 'CR' does not change as far as the row number is correct. In theory, the cluster value 'CT' and the theoretical cluster value 'CR' conform to each other. Meanwhile, unfortunately if the cluster value 'CT' is any value other than 0, 3, or 6, it becomes impossible to refer to a code-word; and at the time, an "erasure" error is settled. In the meantime, if a difference between the cluster value 'CT' and the theoretical cluster value 'CR' is small enough, it becomes still possible to execute referring to a code-word, by way of adjusting the element T[0:5] of the line width (element width) of the T-sequence in such a way that the cluster value 'CT' and the theoretical cluster value 'CR' conform to each other. As described above, according to the present embodiment; the T-sequence is modified (corrected), in the case where the difference (code-word difference) between the cluster value 'CT' and the theoretical cluster value 'CR' is within a range of +/−1.

A reading result with respect to FIG. 8 is as described below. In a result #1; T-sequence is '233223'; the cluster value 'CT' is '7'; the row no. 'ROW#' is '3'; the column no. 'COL#' is '11'; the theoretical cluster value 'CR' is '6'; a difference between the cluster value 'CT' and the theoretical cluster value 'CR' is '1' so that T-sequence (TSEQ) modification can be done; and then, an availability of the T-sequence (TSEQ) modification is 'Yes (Possible)'; candidates for T-sequence (TSEQ) modification are '243223' and '233224'; a result of the T-sequence (TSEQ) modification is 'NG'; and in accordance with the above, an erroneous modification numeral '999' is indicated as a final result.

In a result #2; T-sequence is '868972'; the cluster value 'CT' is '7'; the row no. 'ROW#' is '5'; the column no. 'COL#' is '4'; the theoretical cluster value 'CR' is '3'; a difference between the cluster value 'CT' and the theoretical cluster value 'CR' is '4' so that an availability of the T-sequence (TSEQ) modification is 'No (Impossible)'; and in accordance with the above, an erroneous modification numeral '999' is indicated as a final result.

In a result #3; T-sequence is '562233'; the cluster value 'CT' is '8'; the row no. 'ROW#' is '13'; the column no. 'COL#' is '11'; the theoretical cluster value 'CR' is '0'; a difference between the cluster value 'CT' and the theoretical cluster value 'CR' is '1' so that T-sequence (TSEQ) modification can be done; and then, an availability of the T-sequence (TSEQ) modification is 'Yes (Possible)'; candidates for T-sequence (TSEQ) modification are '662233' and '552233'; a result of the T-sequence (TSEQ) modification is 'OK'; and in accordance with the above, the cluster value 'CT' after the T-sequence (TSEQ) modification is '0', and a normal numeral '806' is indicated as a final result.

In a result #4; T-sequence is '445645'; the cluster value 'CT' is '8'; the row no. 'ROW#' is '15'; the column no. 'COL#' is '12'; the theoretical cluster value 'CR' is '6'; a difference between the cluster value 'CT' and the theoretical cluster value 'CR' is '2' so that an availability of the T-sequence (TSEQ) modification is 'No (Impossible)'; and in accordance with the above, an erroneous modification numeral '999' is indicated as a final result.

In a result #5; T-sequence is '345566'; the cluster value 'CT' is '8'; the row no. 'ROW#' is '40'; the column no. 'COL#' is '5'; the theoretical cluster value 'CR' is '0'; a difference between the cluster value 'CT' and the theoretical cluster value 'CR' is '1' so that T-sequence (TSEQ) modification can be done; and then, an availability of the T-sequence (TSEQ) modification is 'Yes (Possible)'; candidates for T-sequence (TSEQ) modification are '445566', '335566', '345576' and '345565'; a result of the T-sequence (TSEQ) modification is 'OK'; the cluster value 'CT' after the T-sequence (TSEQ) modification is '0', and a normal numeral '536' is indicated as a final result.

As described above, in the example shown in FIG. 8, three of the five errors become objects of T-sequence modification. As a matter of fact, when a modification is made in such a way as to conform the cluster value 'CT' to the theoretical cluster value 'CR', a pertinent code-word is consequently found to exist, with respect to two of the three errors, in referring to a code-word. Thus, the number of ensures can be reduced from five to three.

Incidentally, even in the case where the difference (code-word difference) between the cluster value 'CT' and the theoretical cluster value 'CR' is outside the range of +/−1, theoretically it is still possible to make the same modification. Unfortunately, in that case, there is a risk that the number of candidates for modification becomes large so as to increase a process time. Therefore, in that case, it is recommended to apply such a configuration that meets an objective product cost.

(Concrete Process Flow of T-Sequence Modification)

Figure 9:
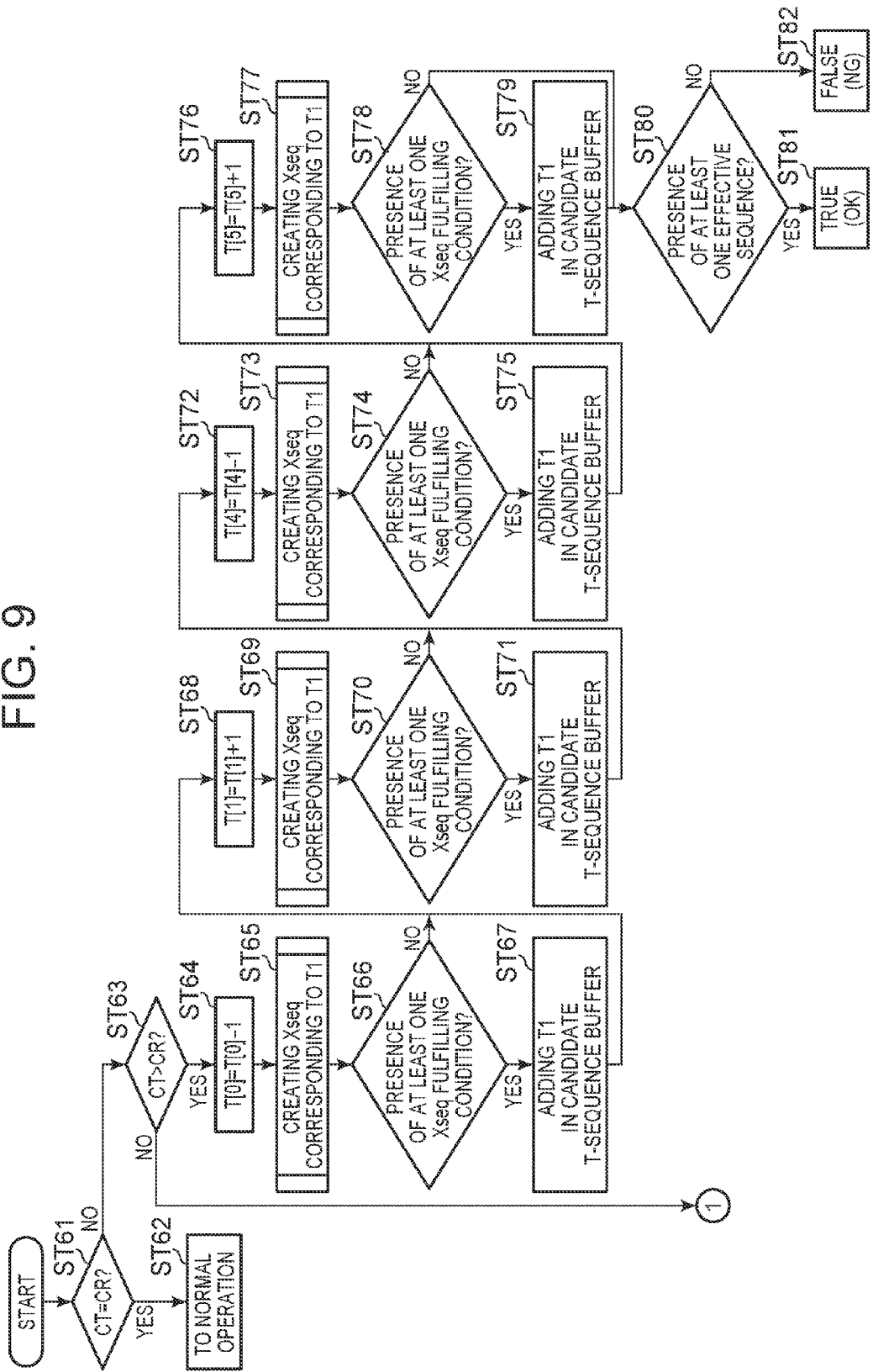
FIG. 9 is a first flowchart showing a concrete process flow of T-sequence modification according to the present embodiment.
Figure 10:
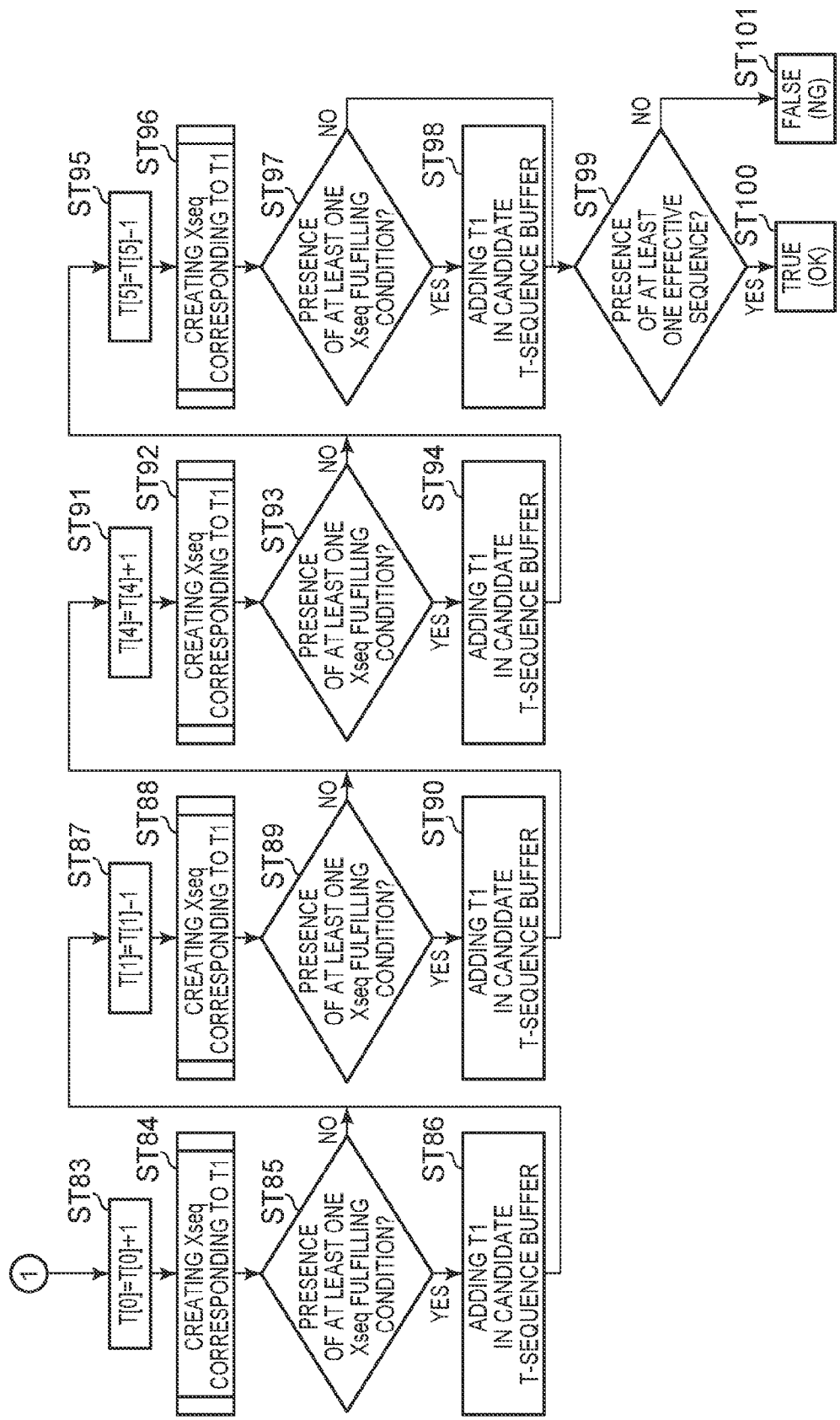
FIG. 10 is a second flowchart showing a concrete process flow of the T-sequence modification according to the present embodiment.

FIG. 9 and FIG. 10 are flowcharts showing a concrete process flow of the T-sequence modification according to the present embodiment. The concrete process flow of the T-sequence modification in the T-sequence modification unit 13314 according to the present embodiment is explained below in association with FIG. 9 and FIG. 10.

In the T-sequence modification unit 13314, at first a comparison is made between the cluster value 'CT' calculated according to the T-sequence and the theoretical cluster value 'CR', in order to judge whether or not both the cluster values are the same (Step ST61). If it is judged at Step ST61 that the cluster value 'CT' and the theoretical cluster value 'CR' are the same, operation is normally carried out, as no T-sequence is needed (Step ST62).

If it is judged at Step ST61 that the cluster value 'CT' and the theoretical cluster value 'CR' are not the same, at first a judgment is made on whether or not the cluster value 'CT' is greater than the theoretical cluster value 'CR' (Step ST 63), for carrying out T-sequence modification. In the case where it is judged at Step ST63 that the cluster value 'CT' is greater than the theoretical cluster value 'CR', operation moves to Step ST64. On the other hand, if it is judged that the cluster value 'CT' is not greater (i.e., smaller) than the theoretical cluster value 'CR', operation moves to Step ST83 shown in FIG. 10.

In the case where the cluster value 'CT' is greater than the theoretical cluster value 'CR'; operation is carried out in order to create a modified T-sequence candidate T1, by way of subtracting one (−1) from a value of T[0] at a highest-order (a first position) in the T-sequence, adding one (+1) to a value of T[1] at a second position from the highest-order side in the T-sequence, subtracting one (−1) from a value of T[4] at a fifth position from the highest-order side in the T-sequence, and adding one (+1) to a value of T[5] at a sixth position from the highest-order side in the T-sequence. In the case where the cluster value 'CT' is smaller than the theoretical cluster value 'CR'; operation is carried out in order to create the modified T-sequence candidate T1, by way of by way of adding one (+1) to a value of T[0] at a highest-order (a first position) in the T-sequence, subtracting one (−1) from a value of T[1] at a second position from the highest-order side in the T-sequence, adding one (+1) to a value of T[4] at a fifth position from the highest-order side in the T-sequence, and subtracting one (−1) from a value of T[5] at a sixth position from the highest-order side in the T-sequence. In other words, according to the present embodiment; adding one (+1) or subtracting one (−1) to/from each element of the cluster value 'CT' is switched, depending on whether or not the cluster value 'CT' is greater than the theoretical cluster value 'CR', so as to create the modified T-sequence candidate T1 in a wide range.

Furthermore, in steps shown in FIG. 9 and FIG. 10; for making it possible to choose a modified T-sequence candidate T1 that has been created, as a candidate having a high potentiality, it is judged whether or not there exists an X-sequence corresponding to the modified T-sequence. Then, if there exists the X-sequence that fulfills a condition, the modified T-sequence T1 is adopted as a T-sequence candidate. The X-sequence is created and it is applied as the condition for a candidate, since the T-sequence is calculated from the X-sequence, as a general rule, by way of a shift operation. Namely, it is because; if there exists the X-sequence that fulfills the condition, it can be assumed with a high potentiality that the modified T-sequence itself actually exists.

At Step ST64, a modified T-sequence T1 is created by way of subtracting one (−1) from the value of T[0] at the highest-order (the first position) in the T-sequence. Subsequently, an X-sequence Xseq corresponding to the modified T-sequence T1 is created (Step ST65). Then, it is judged whether or not, having been created, the X-sequence Xseq exists as at least one X-sequence that fulfills a condition (Step ST66). If it is judged at Step ST66 that the condition is fulfilled, the modified T-sequence T1 is added (stored) in a candidate T-sequence buffer (Step ST67). After the operation at Step ST67, or if it is judged at Step ST66 that the condition is not fulfilled, operation moves to Step ST68.

At Step ST68, a modified T-sequence T1 is created by way of adding one (+1) to the value of T[1] at the second position from the highest-order side in the T-sequence. Subsequently, an X-sequence Xseq corresponding to the modified T-sequence T1 is created (Step ST69). Then, it is judged whether or not, having been created, the X-sequence Xseq exists as at least one X-sequence that fulfills a condition (Step ST70). If it is judged at Step ST70 that the condition is fulfilled, the modified T-sequence T1 is added (stored) in the candidate T-sequence buffer (Step ST71). After the operation at Step ST71, or if it is judged at Step ST70 that the condition is not fulfilled, operation moves to Step ST72.

At Step ST72, a modified T-sequence T1 is created by way of subtracting one (−1) from the value of T[4] at the fifth position from the highest-order side in the T-sequence. Subsequently, an X-sequence Xseq corresponding to the modified T-sequence T1 is created (Step ST73). Then, it is judged whether or not, having been created, the X-sequence Xseq exists as at least one X-sequence that fulfills a condition (Step ST74). If it is judged at Step ST74 that the condition is fulfilled, the modified T-sequence T1 is added (stored) in the candidate T-sequence buffer (Step ST75).

After the operation at Step ST75, or if it is judged at Step ST74 that the condition is not fulfilled, operation moves to Step ST76.

At Step ST76, a modified T-sequence T1 is created by way of adding one (+1) to the value of T[5] at the sixth position from the highest-order side in the T-sequence. Subsequently, an X-sequence Xseq corresponding to the modified T-sequence T1 is created (Step ST77). Then, it is judged whether or not, having been created, the X-sequence Xseq exists as at least one X-sequence that fulfills a condition (Step ST78). If it is judged at Step ST78 that the condition is fulfilled, the modified T-sequence T1 is added (stored) in the candidate T-sequence buffer (Step ST79). After the operation at Step ST79, or if it is judged at Step ST78 that the condition is not fulfilled, operation moves to Step ST80. At Step ST80, it is judged whether or not there exists at least one effective T-sequence among the modified T-sequences T1 added in the candidate T-sequence buffer. In the case where it is judged at Step ST80 that there exists an effective T-sequence, a result of the T-sequence modification is judged to be true (correct, i.e., OK) (Step ST81). On the other hand, in the case where it is judged that there exists no effective T-sequence, the result of the T-sequence modification is judged to be false (incorrect, i.e., NG) (Step ST82).

If it is judged at Step ST63 that the cluster value 'CT' is not greater (i.e., smaller) than the theoretical cluster value 'CR', operation moves to Step ST83 shown in FIG. 10, in order to carry out the steps described below.

At Step ST83, a modified T-sequence T1 is created by way of adding one (+1) to the value of T[0] at the highest-order (the first position) in the T-sequence. Subsequently, an X-sequence Xseq corresponding to the modified T-sequence T1 is created (Step ST84). Then, with reference to the example shown in FIG. 8, the modified T-sequence T1 to be created at this step is calculated by way of adding one (+1) to the value of T[0] at the highest-order (the first position) in the T-sequence '345566' of the result #5, so as to obtain '445566' as a T-sequence candidate. Then, it is judged whether or not, having been created, the X-sequence Xseq exists as at least one X-sequence that fulfills a condition (Step ST85). If it is judged at Step ST85 that the condition is fulfilled, the modified T-sequence T1 is added (stored) in the candidate T-sequence buffer (Step ST86). After the operation at Step ST86, or if it is judged at Step ST85 that the condition is not fulfilled, operation moves to Step ST87.

At Step ST87, a modified T-sequence T1 is created by way of subtracting one (−1) from the value of T[1] at the second position from the highest-order side in the T-sequence. Subsequently, an X-sequence Xseq corresponding to the modified T-sequence T1 is created (Step ST88). Then, with reference to the example shown in FIG. 8, the modified T-sequence T1 to be created at this step is calculated by way of subtracting one (−1) from the value of T[1] at the second position in the T-sequence '345566' of the result #5, so as to obtain '335566' as a T-sequence candidate. Then, it is judged whether or not, having been created, the X-sequence Xseq exists as at least one X-sequence that fulfills a condition (Step ST89). If it is judged at Step ST89 that the condition is fulfilled, the modified T-sequence T1 is added (stored) in the candidate T-sequence buffer (Step ST90). After the operation at Step ST90, or if it is judged at Step ST89 that the condition is not fulfilled, operation moves to Step ST91.

At Step ST91, a modified T-sequence T1 is created by way of adding one (+1) to the value of T[4] at the fifth position from the highest-order side in the T-sequence. Subsequently, an X-sequence Xseq corresponding to the modified T-sequence T1 is created (Step ST92). Then, with reference to the example shown in FIG. 8, the modified T-sequence T1 to be created at this step is calculated by way of adding one (+1) to the value of T[4] at the fifth position in the T-sequence '345566' of the result #5, so as to obtain '335576' as a T-sequence candidate. Then, it is judged whether or not, having been created, the X-sequence Xseq exists as at least one X-sequence that fulfills a condition (Step ST93). If it is judged at Step ST93 that the condition is fulfilled, the modified T-sequence T1 is added (stored) in the candidate T-sequence buffer (Step ST94). After the operation at Step ST94, or if it is judged at Step ST93 that the condition is not fulfilled, operation moves to Step ST95.

At Step ST95, a modified T-sequence T1 is created by way of subtracting one (−1) from the value of T[5] at the sixth position from the highest-order side in the T-sequence. Subsequently, an X-sequence Xseq corresponding to the modified T-sequence T1 is created (Step ST96). Then, with reference to the example shown in FIG. 8, the modified T-sequence T1 to be created at this step is calculated by way of subtracting one (−1) from the value of T[5] at the sixth position in the T-sequence '345566' of the result #5, so as to obtain '345565' as a T-sequence candidate. Then, it is judged whether or not, having been created, the X-sequence Xseq exists as at least one X-sequence that fulfills a condition (Step ST97). If it is judged at Step ST97 that the condition is fulfilled, the modified T-sequence T1 is added (stored) in the candidate T-sequence buffer (Step ST98). After the operation at Step ST98, or if it is judged at Step ST97 that the condition is not fulfilled, operation moves to Step ST99. At Step ST99, it is judged whether or not there exists at least one effective T-sequence among the modified T-sequences T1 added in the candidate T-sequence buffer. In the case where it is judged at Step ST99 that there exists an effective T-sequence, a result of the T-sequence modification is judged to be true (correct, i.e., OK) (Step ST100). On the other hand, in the case where it is judged that there exists no effective T-sequence, the result of the T-sequence modification is judged to be false (incorrect, i.e., NG) (Step ST101).

(Primary Advantageous Effect of the Present Embodiment)

In the stack barcode reader 10, according to the present embodiment, as explained above; the low-level decoding unit 1331 of the decoding unit 133 includes: the X-sequence measurement unit 13311 as a line width measurement unit that measures line width of a bar and a space of the stack barcode (PDF417), on the basis of a plurality of pixel values constituting an image datum; the T-sequence measurement unit 13312 that measures a T-sequence, being a sequence of numerical values, according to line width of a bar and a space of the stack barcode (PDF417) measured by the X-sequence measurement unit; the code-word obtainment unit 13313 that obtains a code-word, corresponding to either the T-sequence measured by the T-sequence measurement unit 13312, or a T-sequence modified; and the T-sequence modification unit 13314 that compares a cluster value 'CT' obtained from the T-sequence by the T-sequence measurement unit, with a theoretical cluster value 'CR', and modifies the T-sequence by using the theoretical cluster value 'CR' and the conversion table of T-sequence/code-word if there appears a difference between the above two cluster values.

More concretely to describe, the low-level decoding unit 1331 according to the present embodiment, the low-level decoding unit 1331 has a conversion function for creating a bar & space pattern, which is a sequence of numerical values called an "X-sequence", formed with an array of line width (element width), out of the scanning reflectance rate characteristics (waveform); in order to convert the X-sequence into a T-sequence of bars and spaces, formed with an array of line width (element width). The low-level decoding unit 1331 has a cluster comparing function for comparing a cluster value 'CT', calculated according to the converted T-sequence of bars and spaces, with a theoretical cluster value 'CR' determined according to a row number. Furthermore, the low-level decoding unit 1331 also has a line width (element width) modification function for modifying the T-sequence, in the case where exists a difference between the cluster value 'CT' and the theoretical cluster value 'CR', in such a way as to cancel the difference in accordance with a degree of the difference.

Therefore, in accordance with the present embodiment, an advantageous effect can be obtained as described below. It is possible in the present embodiment, for example, to prevent an error, which can be detected beforehand, from coming up; and to reduce a processing load in an error-correction step. Moreover, even in the case where the number of errors exceeds an error correction limit, it becomes still possible to carry out decoding operation for the stack barcode (PDF417).

Moreover, according to the present embodiment, the T-sequence modification unit 13314 modifies the T-sequence in such a way as to conform the cluster value 'CT', obtained from the T-sequence, to the theoretical cluster value 'CR'. Thus, in the present embodiment, the T-sequence is modified in such a way that the cluster value 'CT', obtained from the T-sequence, conforms to the theoretical cluster value 'CR', so that it is still possible to execute referring to a code-word even in the case where an error exists.

Furthermore, according to the present embodiment; as explained in association with FIG. 9 and FIG. 10, the T-sequence modification unit 13314 obtains at least one effective T-sequence, for referring to a code-word, out of a plurality of T-sequences modified so as to be different sequences of numerical values. Thus, in the present embodiment, at least one effective T-sequence, for referring to a code-word, is obtained out of a plurality of T-sequences modified so as to be different sequences of numerical values, so that it becomes possible, for example, to reduce the errors that can be recognized in advance, as many as possible.

Furthermore, according to the present embodiment; the T-sequence modification unit 13314 carries out T-sequence modification when the difference between the cluster value 'CT' obtained from the T-sequence and the theoretical cluster value 'CR' is within a range of +/−1. Thus, in the present embodiment, the T-sequence modification is carried out when the difference between the cluster value 'CT' obtained from the T-sequence and the theoretical cluster value 'CR' is within a range of +/−1, so that the number of candidates for modification can appropriately be controlled, and it becomes possible to prevent a process time from increasing.

Moreover, according to the present embodiment; the code-word obtainment unit 13313 obtains a pertinent code-word, by way of referring to a code-word corresponding to a T-sequence that the T-sequence modification unit 13314 has modified. Thus, in the present embodiment, the pertinent code-word is obtained, by way of referring to a code-word corresponding to a T-sequence that the T-sequence modification unit 13314 has modified, so that it becomes possible, for example, to reduce the errors that can be recognized in advance, as many as possible.

As a result, according to the present embodiment; in reading a stack barcode (PDF417), it is possible to prevent an error, which can be detected beforehand, from coming up; and to reduce a processing load in an error-correction step.

Moreover, even in the case where the number of errors exceeds an error correction limit, it becomes still possible to carry out decoding operation for the stack barcode (PDF417).

Other Embodiments

Although, the structure analyzing unit 132 is positioned at an output side of the symbol cutout unit 1312 of the position detection processing unit 131 in the embodiment mentioned above, there may be provided a tilt correction unit between an output side of the symbol cutout unit 1312 and an input side of the structure analyzing unit 132; wherein the tilt correction unit being for detecting a tilt angle of the barcode 21 that has been cut out, in order to make a correction for the tilt angle, and to supply an image datum of the barcode 21, after the tilt correction, to the structure analyzing unit 132. The tilt correction unit is, for example, what Japanese Unexamined Patent Application Publication No. 2014-191755 discloses.

When the stack barcode 21 is scanned by using the imaging unit 11, the direction of rows DR (the Y-axis direction) of the stack barcode 21 is not necessarily positioned so as to be perpendicular to the transfer mechanism 112. Accordingly, an image datum of a stack barcode read out by using the imaging element 111 is occasionally tilted. In other words, sometimes the direction of rows DR does not conform to a vertical direction of an image datum stored in the image memory 12. Therefore, a configuration may be made in such a way as to carry out a tilt correction in a step of reading the image memory 12.

(Variations)

Although, a T-sequence is modified (corrected) in the embodiment mentioned above in the case where a difference (code-word difference) between the cluster value 'CT' and the theoretical cluster value 'CR' is within a range of +/−1, it is still possible to make the same modification even when the difference is outside the range of +/−1. In such a case, there is a chance that the number of candidates for modification becomes so large as to increase a process time; and therefore it is recommended to apply a configuration that meets an objective product cost.

Incidentally, the method explained above in detail can be so configured as to be a program in accordance with the procedures described above, for being executed by a computer such as a CPU. Then, with the program being stored in a recording medium, such as a semiconductor memory, a magnetic disc, an optical disk, and a Floppy (a registered trademark) disk; the method can be configured in such a way that the computer, in which the recording medium is installed, accesses the program in order to execute the program.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A stack barcode reader for use with a stack barcode in which information is encoded so as to be expressed with a bar and a space, the stack barcode reader comprising:
   an imaging unit for imaging the stack barcode;
   an image memory for storing an image datum of the stack barcode imaged by the imaging unit; and
   a data processing unit comprising a decoding unit for decoding an encoded information expressed as the stack barcode, on the basis of the image datum;
   wherein, the decoding unit comprises:
   a line width measurement means for measuring width of a bar and a space of the stack barcode, on the basis of a plurality of pixel values constituting the image datum;
   a T-sequence measurement means for measuring a T-sequence, being a sequence of numerical values, according to line width of a bar and a space of the stack barcode measured by the line width measurement means;
   a code-word obtainment means for obtaining a code-word corresponding to the T-sequence at least measured by the T-sequence measurement means; and
   a T-sequence modification means that compares a cluster value obtained from the T-sequence by the T-sequence measurement means, with a theoretical cluster value, and modifies the T-sequence by using the theoretical cluster value and the conversion table of T-sequence/code-word if there appears a difference between the two cluster values.

2. The stack barcode reader according to claim 1;
   wherein, the T-sequence modification means modifies the T-sequence in such a way that the cluster value, obtained from the T-sequence, conforms to the theoretical cluster value.

3. A stack barcode reading method for use with a stack barcode reader comprising an imaging unit for imaging a stack barcode in which information is encoded so as to be expressed with a bar and a space; an image memory for storing an image datum of the stack barcode imaged by the imaging unit; and a data processing unit including a decoding unit for decoding an encoded information expressed as the stack barcode, on the basis of the image datum; the stack barcode reading method comprising:
   a first step comprising measuring width of a bar and a space of the stack barcode, on the basis of a plurality of pixel values constituting the image datum;
   a second step comprising measuring a T-sequence, being a sequence of numerical values, according to line width of a bar and a space of the stack barcode measured by way of the first step;
   a third step comprising obtaining a code-word corresponding to the T-sequence at least measured by way of the second step; and
   a fourth step comprising comparing a cluster value obtained from the T-sequence by the second step, with a theoretical cluster value, and modifying the T-sequence by using the theoretical cluster value and the conversion table of T-sequence/code-word if there appears a difference between the above two cluster values.

4. The stack barcode reading method according to claim 3;
   wherein, the fourth step comprises modifying the T-sequence in such a way that the cluster value, obtained from the T-sequence, conforms to the theoretical cluster value.

5. A stack barcode reader for use with a stack barcode in which information is encoded so as to be expressed with a bar and a space, the stack barcode reader comprising:
   an imager configured to image the stack barcode;
   an image memory configured to store an image datum of the stack barcode; and
   a data processor comprising a decoder configured to decode an encoded information expressed as the stack barcode, on the basis of the image datum;
   wherein, the decoder is configured to;
   measure width of a bar and a space of the stack barcode, on the basis of a plurality of pixel values constituting the image datum;
   measure a T-sequence, being a sequence of numerical values, according to line width of a bar and a space of the stack barcode;
   obtain a code-word corresponding to the T-sequence; and
   compare a cluster value obtained from the T-sequence with a theoretical cluster value, and modify the T-sequence by using the theoretical cluster value and the conversion table of T-sequence/code-word if there appears a difference between the two cluster values.

* * * * *